Jan. 15, 1929.　　　　　　　　　　　　　　1,699,096
F. T. COLDWELL
PROTECTIVE ARRANGEMENT
Filed April 1, 1927
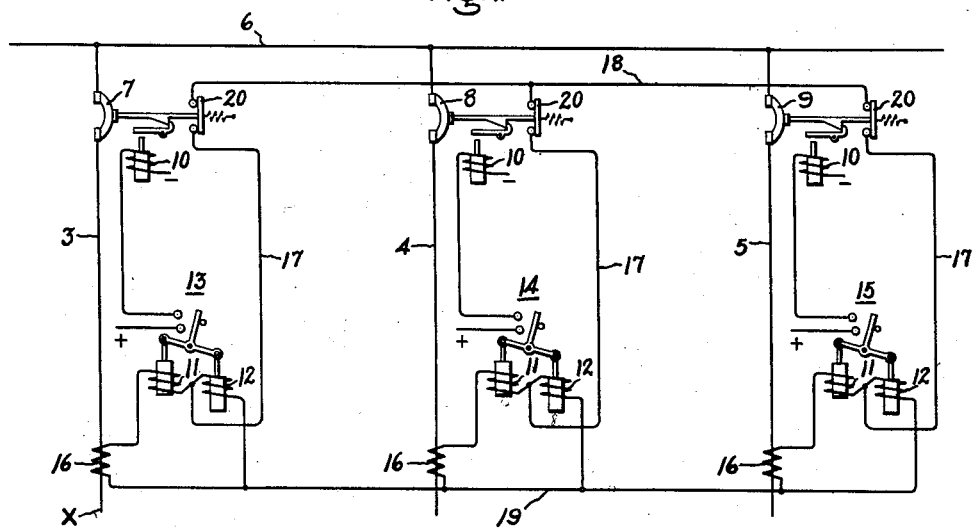
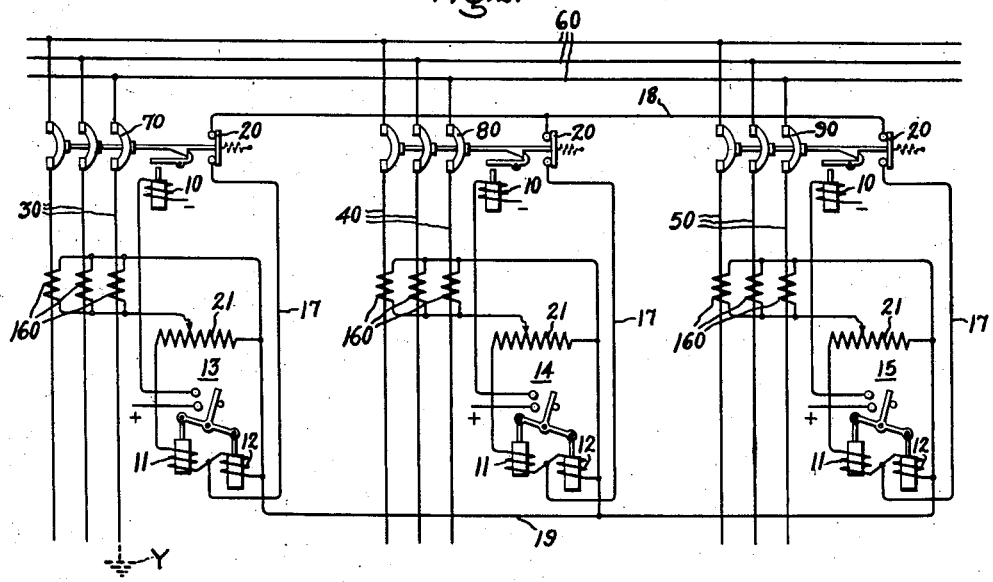
Inventor:
Frank T. Coldwell,
by
His Attorney.

Patented Jan. 15, 1929.

1,699,096

UNITED STATES PATENT OFFICE.

FRANK T. COLDWELL, OF ALPLAUS, NEW YORK, ASSIGNOR TO GENERAL ELECTRIC COMPANY, A CORPORATION OF NEW YORK.

PROTECTIVE ARRANGEMENT.

Application filed April 1, 1927. Serial No. 180,167.

My invention relates to improvements in protective arrangements for electric systems and more particularly for a plurality of parallel circuits such as feeders, transmission lines, and the like and has for an object to provide an improved protective arrangement for selectively controlling a plurality of circuits under abnormal conditions so as to disconnect the faulty circuit. Another object of my invention is to provide an improved ground fault protective arrangement for use in a grounded neutral system at the outgoing ends of a plurality of parallel feeders having different impedances.

My invention will be better understood from the following description when considered in connection with the accompanying drawing and its scope will be pointed out in the appended claims.

In the accompanying drawings, Fig. 1 illustrates in a single line diagram, for clearness, a protective arrangement embodying my invention and Fig. 2 illustrates diagrammatically another embodiment of my invention.

In the embodiment of my invention shown in Fig. 1, a plurality of feeders 3, 4, 5 are arranged to be connected to a bus 6 through suitable circuit controlling means or switches such as circuit breakers 7, 8, 9 shown as of the latched closed type and having trip coils 10. For selectively controlling the circuits of the feeders 3, 4, 5 through their respective circuit breakers on the occurrence of abnormal conditions so as to disconnect the faulty feeder, I provide, in accordance with my invention, electroresponsive means such as relays 13, 14, 15, one for each circuit, comprising an actuating element having a winding 11 and a restraining element having a winding 12. As shown these relays are arranged to control the circuits of the trip coils of the respective circuit breakers.

The actuating winding 11 of each relay is connected and arranged to be energized proportionally to the current in the circuit with which the relay is associated. For this purpose the actuating winding 11 may be connected in series with the restraining winding 12 across the secondary of a current transformer 16. The restraining winding 12 is connected and arranged to be energized proportionally to the average of the currents in the feeders 3, 4, 5, and by the average of the currents I mean the vectorial sum of the currents of the feeders in service divided by the number of feeders in service. For this purpose both the current transformer secondaries and the restraining windings 12 are connected in parallel through conductors 17, 18, 19, each of the conductors 17 extending from a point intermediate the actuating and restraining windings to the conductor 18 and the conductor 19 connecting corresponding terminals of the current transformer secondaries. In order to maintain the same protection on the disconnection of a faulty feeder, each of the conductors 17 may have in series therewith the contacts of an auxiliary switch 20 which is arranged to be closed when the circuit breaker is closed and open when the circuit breaker is open.

The differential relays 13, 14, 15 are preferably of the type having a predetermined bias action, that is, circuit controlling action is dependent on a predetermined ratio of the currents in the windings, and while I have shown schematically a balanced arm plunger armature type of differential relay whose actuating winding may have more turns than its restraining winding, any suitable differential relay, examples of which are known to the art, may be employed.

In considering the operation of the embodiment of my invention shown in Fig. 1, it may be assumed that the feeders 3, 4, 5 are outgoing from a station bus 6 to an incoming bus of another station of which nothing is shown as it involves no part of my invention. If the currents in each of the corresponding phase conductors, only one being shown in Fig. 1, of the feeders 3, 4, 5 are equal and in phase, then the actuating windings 11 of the relays 13, 14, 15 are energized by currents of like value. The restraining windings 12 are also energized by currents of the same value, since the points intermediate the actuating and restraining windings at which the conductors 17 are connected, are at the same potential. The restraining winding 12, however, due to its bias, for example more turns, maintains the movable contact of the relay in the position shown. This equal current condition holds, of course, normally and also in the case of through faults, that is, faults which occur elsewhere than on the feeders 3, 4, 5, but are fed through the feeders 3, 4, 5 themselves.

If now a fault, either interphase or ground, occurs on one of the feeders as indicated at X on the feeder 3, then the currents in the feeders become unequal and the points intermediate the actuating and restraining winding at which the conductors 17 are connected are not at equal potentials and currents flow in the conductors 17, 18, 19. Assuming feeder conditions such that twelve amperes appears in the actuating winding of the relay 13 associated with the faulty feeder 3 and a current of six amperes appears in each of the actuating windings of the relays 14, 15 associated with the sound feeders 4, 5 respectively and that the feeder currents are in phase, then since the restraining windings 12 have substantially the same impedance and are connected in parallel, the current in and also the voltage across each of these windings must be substantially the same. Consequently, with three relays and a total available current of twenty-four amperes, a current of eight amperes appears in the restraining winding of each relay, that is, a current proportional to the sum of the feeder currents divided by the number of feeders in service. Under these conditions, the relay 13 in the feeder 3 operates to effect the opening of the circuit breaker 7, but the relays in the feeders 4 and 5 do not operate since the bias of their restraining windings 12 is increased by the effect of the additional two amperes flowing in each. On the opening of the circuit breaker 7, the relay 13 is removed from the secondary or protective circuit comprising the relays 14, 15 and the conductors 17, 18, 19, but the feeders 4, 5 remaining in service are protected in the manner just described.

In the cases described the currents in the corresponding phase conductors of the feeders 3, 4, 5 have been assumed to be in phase and consequently the arithmetical and vectorial sums are identical. Due, however, to differences between the characteristic of the feeders, the currents in the corresponding phase conductors may not be in phase, but in any event since the restraining windings are connected in parallel and each has substantially the same impedance, each is energized proportionally to the average of the currents in the corresponding feeder conductors.

In the embodiment of my invention shown in Fig. 2 a plurality of feeders 30, 40, 50, shown as three-phase, are arranged to be connected to a bus 60 through circuit breakers 70, 80, 90 respectively which are arranged to be controlled through their trip coils 10 by the relays 13, 14, 15. Each conductor of each feeder is provided with a current transformer 160 and the secondaries of the three current transformers for each feeder are connected in parallel so that a device connected across them will be energized proportionally to the vectorial sum of the currents in the three conductors of the feeder. This sum is zero except on the occurrence of earth leakage currents. In considering this modification of my invention, it is assumed that the system of which the feeders 30, 40, 50 form a part has a grounded neutral. These parallel connected transformer secondary groups may be connected in the secondary or protective circuit comprising the relays 13, 14, 15 in precisely the same manner as the single transformer secondaries shown in Fig. 1. In order, however, to avoid the use of special current transformers for each of the feeders 30, 40, 50 since they may have different characteristics, I may connect a relatively inexpensive adjustable transforming means such as an auto-transformer 21 across each group of parallel connected current transformer secondaries. These auto-transformers are then connected in the protective circuit comprising the relays 13, 14, 15 and the conductors 17, 18, 19 in the same manner as the secondaries of the current transformers in Fig. 1. Since the transformation ratio of the auto-transformers may readily be varied, it is possible to use standard current transformers and yet so to compensate for the inherent differences in line characteristics as to get the desired balance. This also helps to make possible relatively sensitive settings for ground faults on the feeders without the possibility of erroneous operation on through faults.

In considering the operation of this modification of my invention, it will be obvious that the actuating winding 11 of each of the relays 13, 14, 15 is energized by the vectorial sum of the currents in the three phase conductors of the feeder with which the relay is associated. This sum is zero except in the case of ground faults and, therefore, the average of these vectorial sums is also zero except in case of ground faults. Consequently neither the actuating nor the restraining windings of the relays are energized except when ground faults occur.

In case of a through fault to ground, a conductor in each feeder corresponding to the grounded conductor of the system will carry ground fault current, but it will be the same in each feeder. Consequently the actuating and restraining windings of each relay are energized by the same value of current and because of their bias no relays operate. If, however, one of the conductors of feeder 30 becomes grounded as indicated at Y, the fault is fed by feeder 30 and also by feeders 40 and 50 through their corresponding phase conductors as long as the circuits of the feeders at the other end are closed, but the greater current will be supplied by the grounded conductor in the feeder 30 while the others will divide the fault current through them more or less equally. The actuating winding 11 of the relay 13 will be energized proportionally to this greater current and carry, for example, five amperes while the actuating windings of each of the relays 14, 15 will be energized proportionally to the fault current in each of the feeders 40, 50 and carry, for example, two amperes. The restraining windings 12 of each of the relays, however, will be energized by the average of these three currents or three amperes. Consequently relay 13 will operate to effect the opening of the circuit breaker 70, but the relays 14, 15 will not operate since their restraining or opposing windings 12 will predominate over their actuating windings 11. If it should so happen that the circuit breakers at the other ends of the feeder 30 opened before circuit breaker 70, then the only actuating winding to be energized is that associated with the relay 13. This actuating winding will carry, for example, five amperes and the restraining winding 12 of each relay will carry one-third of this five amperes. In the above it has been assumed that the fault currents are precisely in phase, but whether they are or not is immaterial since the restraining windings 12 are always energized by the average of the vectorial sum of the fault currents.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is:

1. A protective arrangement for a plurality of parallel circuits including a relay for each circuit having an actuating winding connected to be energized proportionally to the current of the circuit and a restraining winding connected to be energized proportionally to the average of the currents of the circuits.

2. In combination with a plurality of parallel circuits and circuit controlling means therefor, means operative on the occurrence of abnormal circuit conditions selectively to effect the opening of the circuit controlling means of the faulty circuit comprising a relay for each circuit having a winding connected to be energized proportionally to the current of the circuit and an opposing winding connected to be energized proportionally to the average of the currents of the circuits.

3. A protective arrangement for a plurality of parallel circuits including a relay for each circuit having a winding connected to be energized proportionally to the vectorial sum of the currents in the conductors of the circuit and an opposing winding connected to be energized proportionally to the average of the vectorial sums of the currents of the circuits.

4. In combination with a plurality of parallel circuits, means for selectively controlling the circuits on the occurrence of ground faults including a differential electroresponsive means for each circuit having an actuating winding connected to be energized proportionally to the vectorial sum of the currents in the conductors of the circuit and a restraining winding connected to be energized proportionally to the average of the vectorial sums of the currents of the circuits.

5. In combination with a plurality of electric circuits, electroresponsive means for each circuit including an actuating element connected and arranged to be energized proportionally to the current of the circuit and a restraining element connected and arranged to be energized proportionally to the average of the currents of the circuits.

6. A protective arrangement for a plurality of parallel circuits comprising a switch in each circuit and means for selectively operating said switches in response to abnormal circuit conditions comprising a device for each circuit having an actuating winding connected to be energized proportionally to the current of the associated circuit and a restraining winding connected to be energized proportionally to the average of the currents in all of said parallel circuits.

In witness whereof, I have hereunto set my hand this 31st day of March 1927.

FRANK T. COLDWELL.